Dec. 28, 1926.
C. DREXLER
FRICTION CLUTCH
Filed Dec. 12, 1925
1,611,898
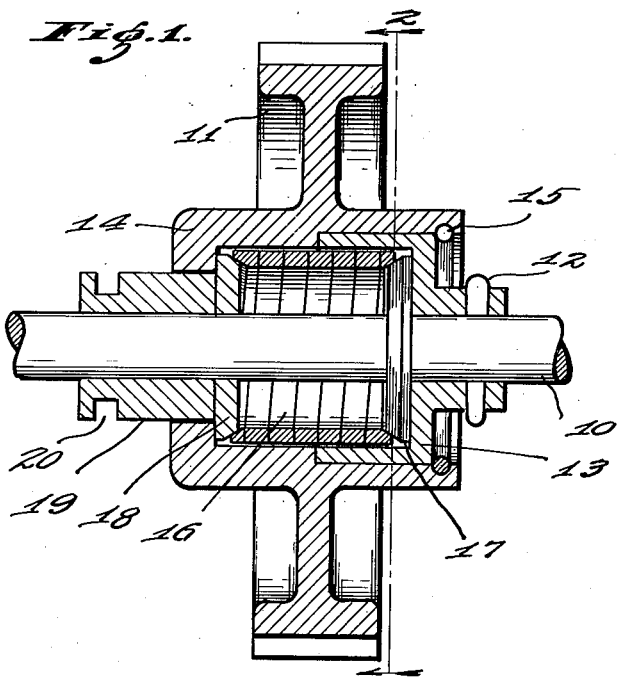
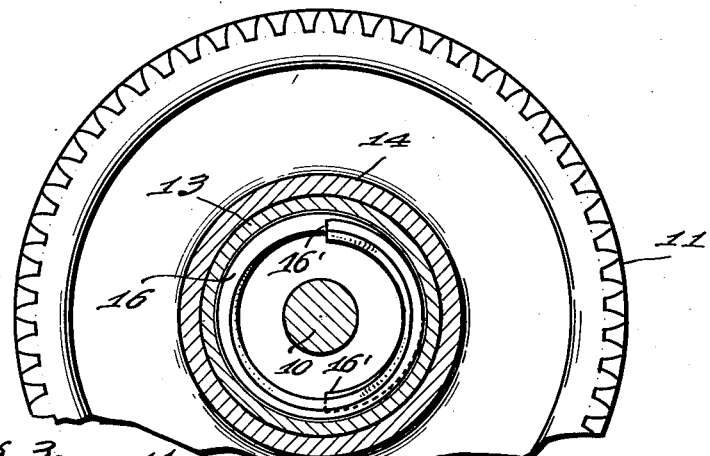
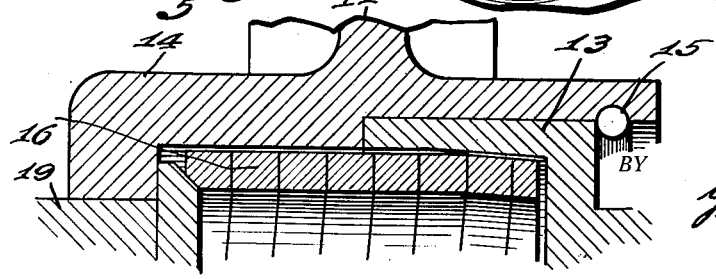
INVENTOR.
CHARLES DREXLER,
BY
ATTORNEY.

Patented Dec. 28, 1926.

1,611,898

UNITED STATES PATENT OFFICE.

CHARLES DREXLER, OF INDIANAPOLIS, INDIANA, ASSIGNOR TO L. G. S. DEVICES CORPORATION, OF INDIANAPOLIS, INDIANA, A CORPORATION OF INDIANA.

FRICTION CLUTCH.

Application filed December 12, 1925. Serial No. 74,925.

It is the object of my invention to produce a clutch for operation between two relatively rotatable, coaxial members, which clutch when engaged will operate to clutch the two members firmly together when they tend to rotate relatively in one direction while permitting free relative rotation in the other direction and which when disengaged will permit free relative rotation of the two members in either direction.

I accomplish the above objects by providing the two relatively rotatable members with alined axial recesses, and I provide a helical spring for reception within such recesses, this spring having a normal external diameter slightly less than the diameter of the recesses; and I provide means for causing operative engagement of the end turns of such spring with the two relatively rotatable members respectively in order that the spring may then unwind and be forced into firm frictional engagement with the walls of its associated recesses when the two members rotate relatively in a direction tending to unwind the spring.

The accompanying drawing illustrates my invention: Fig. 1 is a longitudinal section through a clutch embodying my invention; Fig. 2 is a cross section on the line 2—2 of Fig. 1; and Fig. 3 is a longitudinal fragmental section illustrating a modification of my invention.

The two relatively rotatable members shown in the drawing are a shaft 10 and a gear 11 although it will be evident that other relatively rotatable members may be connected by my clutch. Mounted upon the shaft 10 and held rigid therewith as by the tapered pin 12 is a cup-shaped member 13 which extends into a counter-bored portion of the bore of the gear-hub 14. To prevent relative axial movement of the gear 11 and the cup 13, the gear-hub 14 extends outward beyond the rear edge of the cup 13 and is provided internally with an annular groove for the reception of a split spring ring 15 which engages the rear face of the cup 13.

Located within the cup 13 and extending axially into the bore of the gear-hub 14 is a helical spring 16, the external diameter of which is slightly smaller than the internal diameter of the recesses in which it lies. At the ends of this spring, its inner surface is beveled so as to be complementary to the frusto-conical surfaces of two disks 17 and 18 which are located at opposite ends of the spring and engage the bottoms of the recesses of the cup 13 and gear-hub 14 respectively.

Surrounding the shaft 10 and extending through the end wall of the gear-hub 14 is an axially slidable sleeve 19 which at its inner end engages the disk 18 and which near its outer end may be provided with an annular groove 20 for the reception of any convenient shifting means. If desired, the sleeve 19 may be made rigid with the disk 18.

I have found it advantageous to bend each spring-end 16' axially inward as indicated in Fig. 2. When the disk 18 is moved toward the disk 17, the conical faces of the two disks first engage these in-turned ends which insure that the spring 16 will be unwound from its ends when the gear and shaft rotate in a direction tending to unwind the spring. This in-turned end also makes it possible to vary the force with which the end spring-turns are forced outwardly against the walls of their respective recesses.

With the parts in the position shown in Fig. 1, the clutch is disengaged and the gear 11 may rotate freely in either direction relative to the shaft 10. If, however, the sleeve 19 is forced inwardly, the end-turns of the spring will be expanded into engagement with the walls of the recesses in the cup 13 and gear hub 14. Under these conditions, should the gear 11 and shaft 10 tend to rotate relatively in a direction to unwind the spring 16, the spring 16 will expand into frictional engagement with the walls of its associated recesses and will clutch the gear and shaft together. Should the two parts tend to rotate relatively in a direction to wind the spring when the clutch is engaged, the diameter of the spring is decreased and it recedes from the walls of its associated recesses to permit such relative rotation of the gear and shaft.

In the modification of my invention illustrated in Fig. 3, the disk 17 is omitted and the recess in the cup 13 is tapered slightly so that the recess wall engages the last turn or two of the spring. In this construction, therefore, the spring is always operatively engaged with the cup 13, but its engagement with the gear-hub 14 is controlled by the position of the sleeve 19 in the manner above described.

I claim as my invention:—

1. In combination, two relatively rotatable members provided with alined circular recesses, a coil spring located in said recesses, said coil spring being normally smaller in external diameter than the diameter of said recesses, and axially movable means for expanding said spring only near each end thereof into frictional engagement with the walls of said recesses.

2. In combination, two relatively rotatable members provided with alined circular recesses, a coil spring located in said recesses, said coil spring being normally smaller in external diameter than the diameter of said recesses, oppositely disposed conical members located at the ends of said spring, said conical members being relatively axially movable.

3. In combination, two relative rotatable members provided with alined circular recesses, a coil spring located in said recesses, said coil spring being normally smaller in external diameter than the diameter of said recesses, and means for expanding said spring only near each end thereof into frictional engagement with the walls of said recesses.

4. In combination, two relatively rotatable members provided with alined circular recesses, a coil spring located in said recesses, said coil spring being normally smaller in external diameter than the diameter of said recesses, and means for expanding one end turn of said spring into engagement with the recess in one of said members and for causing operative engagement of the other end turn of said spring with the other of said members.

5. The combination set forth in claim 2 with the addition that the ends of said spring are bent radially inward.

6. The combination set forth in claim 3 with the addition that one end of said spring is bent radially inward.

In witness whereof, I have hereunto set my hand at Indianapolis, Indiana, this 3d day of December, A. D. one thousand nine hundred and twenty-five.

CHARLES DREXLER.